(12) United States Patent
Korich et al.

(10) Patent No.: US 6,378,223 B1
(45) Date of Patent: Apr. 30, 2002

(54) SHINGLE GAUGE

(76) Inventors: George Korich, 7 Pierce St., Leominster, MA (US) 01453; Douglas E. Bournay, 1708 Warren Ave., Jackson, MI (US) 49204

( * ) Notice: Subject to any disclaimer, the term of this patent is extended or adjusted under 35 U.S.C. 154(b) by 0 days.

(21) Appl. No.: 09/510,418

(22) Filed: Feb. 22, 2000

(51) Int. Cl.$^7$ ................................................ G01B 3/30
(52) U.S. Cl. ...................................................... 33/649
(58) Field of Search ........................... 33/649, 648, 646, 33/647

(56) References Cited

U.S. PATENT DOCUMENTS

| | | | | |
|---|---|---|---|---|
| 377,085 A | * | 1/1888 | Russell | 33/647 |
| 377,178 A | * | 1/1888 | Traut | 33/647 |
| 832,962 A | * | 10/1906 | Fellows | 33/648 |
| 1,556,649 A | * | 10/1925 | Topping | 33/648 |
| 1,598,986 A | * | 9/1926 | Ping | 33/647 |
| 3,257,671 A | * | 6/1966 | Crookston | 33/648 |
| 3,792,852 A | | 2/1974 | Reniker | 33/648 |
| 5,692,311 A | * | 12/1997 | Paquin | 33/649 |

FOREIGN PATENT DOCUMENTS

DE 586485 * 10/1933

* cited by examiner

Primary Examiner—Christopher W. Fulton
(74) Attorney, Agent, or Firm—O'Connell Law Firm

(57) ABSTRACT

A shingle gauge comprising a gauge base, a first shingle engaging surface disposed adjacent to a first end of the gauge base, and a second shingle engaging surface disposed adjacent to a second end of the gauge base. A distance between the first and second shingle engaging surfaces can be adjusted by selectively locating an engaging member, such as a bolt, that retains the second shingle engaging surface, which may comprise a preferably round bolt head, within a selected aperture of a plurality of apertures in the gauge base. A nut can selectively lock the engaging member in position relative to a given aperture. The second end of the gauge base can be beveled to lift and separate shingles. Length incrementation can be disposed along a first side of the gauge base and the first shingle engaging surface can comprise a straight edge extending from only a second side of the gauge base. A plurality of aligning notches can be disposed on the gauge base in alignment with the plurality of apertures. The shingle gauge can be formed from a single piece of material bent into a generally U-shaped configuration wherein a first leg of the U comprises a handle and a second leg of the U comprises the gauge base.

19 Claims, 3 Drawing Sheets

SHINGLE GAUGE

FIELD OF THE INVENTION

The present invention relates generally to devices for aligning and spacing shingles on a work surface. More particularly, disclosed herein is a shingle gauge for determining and controlling the overlap and exposure of shingles during the installation of the shingles on a work surface.

BACKGROUND OF THE INVENTION

Shingles of the type used for roofing and building construction can be manufactured from a variety of materials. The material used in the manufacture of a shingle is of course dependent on the intended use of the shingle and the external conditions to which the shingle material will be exposed. Shingles or shinglelike products have a variety of uses in the building construction process. They are used to cover roofing surfaces as well as to cover the exterior walls of a building structure. For example, shingles may be manufactured from asphalt material for roofing purposes or from wood when used as clapboard on exterior wall surfaces. Regardless of the material used, however, proper installation demands that each row of shingles be laid along a straight and level course that ensures consistent overlap and exposure and a parallel orientation of adjacent rows of shingles.

One knowledgeable in the art will be aware that roofing shingles essentially comprise a rectangular strip of material with a plurality of slots extending perpendicularly from a lower longitudinal edge of the shingle to a mid-portion of the shingle. Shingle installers often gauge the amount of overlap between rows of shingles by aligning the lower edge of the shingle being installed directly with the tips of the slots in the underlying shingle or spaced a given distance from the tips of the slots in the underlying shingle. Disadvantageously, however, this method often leads to deviations in overlap between adjacent shingles. This deviation can result, for example, from the fact that slots in shingles often vary at least slightly in length whereby the users reference point is unreliable. Deviation also manifests itself when multiple installers are working on a given roof because different roofing installers often have different concepts of alignment. Still further, deviation can often result from the fact that properly aligning shingles under such a method demands attentiveness that can not be consistently maintained during the rapid process of roofing installation.

Unfortunately, even slight variances in the degree of overlap between adjacent shingles can result in misalignment of an entire shingle row. This misalignment can be aggravated over the course of a given row and even further aggravated with each succeeding row. This can lead to a gross misalignment of an entire roofing or siding installation. One will appreciate that such misalignment can detract from the aesthetic beauty of the finished structure. More importantly, however, misalignment can lead to problems with leakage and difficulties in installation such as when a row of shingles intersects with a peak of a roof in a skewed manner.

A number of devices have been used by practitioners of the art in attempting to ensure straight and level courses. Unfortunately, many current devices suffer from a number of disadvantages. Many gauges of the prior art have a number of connected parts that must work in unison and are cumbersome and not easily maneuvered by a single installer. Furthermore, other prior art devices require plural straight edges, which are connected by an adjustable bar, to align adjacent shingles. Such devices often require two actors to set the shingle exposure and overlap. Still further, many current devices require assembly in the field, which further complicates the process of installation.

These problems are particularly apparent in the case of an experienced layperson because laypeople lack sufficient experience in shingling and often have difficulty in maintaining a true line of parallel exposure and overlap between adjacent rows of shingles. Furthermore, some of the gauges now available have the disadvantage of requiring a certain degree of experience to assemble and operate. Still further, some of these gauges are too expensive for a handyperson to invest in when he or she will only require its use on an occasional basis.

In light of the above, it is clear that there is a need for an invention that could provide a solution to at least one of the problems discussed. However, an invention solving each and every one of the aforementioned problems while providing a number of heretofore unrealized advantages would certainly represent a marked advance in the art.

SUMMARY OF THE INVENTION

Advantageously, a principle object of the present invention is to provide a shingle gauge that enables one installing shingles to ensure the accurate and consistent overlap and exposure of shingles during their installation.

In furtherance of this primary object, the invention has the incidental objects of providing a shingle gauge that is durable, lightweight, and easily transported by the ultimate user.

Another object of the invention is to provide a shingle gauge that allows for rapid shingle installation, particularly by an installer employing a powered nail gun.

Furthermore, the present invention seeks to provide a shingle gauge that is a unitary hand held device that is easily operated by a single actor.

A further object of the invention is to provide the ultimate user with a gauge that is simply and quickly adjustable to a plurality of shingle exposure settings.

Of course, one must note that additional objects and advantages of the present invention will become obvious both to one who reads this specification and views the accompanying drawings and to one who has an opportunity to make use of an embodiment of the present invention for a shingle gauge.

In carrying forth these objects, a most basic embodiment of the shingle gauge comprises a gauge base, a first shingle engaging surface disposed adjacent to a first end of the gauge base, and a second shingle engaging surface disposed adjacent to a second end of the gauge base. In such an embodiment, the first shingle engaging surface and the second shingle engaging surface naturally will be separated by a given distance. Even under this most basic embodiment of the invention, a user can control the overlap and exposure of shingles during installation by engaging the first shingle engaging surface with an edge of a first course of shingles and engaging the second shingle engaging surface with an edge of a second course of shingles.

A preferred shingle gauge will further include a means for adjusting the distance between the first shingle engaging surface and the second shingle engaging surface. Such a means could comprise a plurality of apertures spaced longitudinally along the gauge base for selectively receiving an engaging member that is coupled to the second shingle engaging surface. Under such an arrangement, a user can insert the engaging member into a selected aperture of the plurality of apertures to select the distance between the first shingle engaging surface and the second shingle engaging surface.

The engaging member could comprise a bolt and the second shingle engaging surface could comprise a bolt head. In such a case, the shingle gauge preferably will further include a nut for selectively locking the engaging member and the second shingle engaging surface in a given aperture of the plurality of apertures. Preferably, the bolt head will be generally round whereby the distance between the first shingle engaging surface and the second shingle engaging surface will be consistent without regard to the angular orientation of the bolt head.

Still further improvements could be incorporated into the shingle gauge to enhance its utility still further. For example, the second or distal end of the gauge base could be beveled to enable a user to lift and separate shingles easily and without abrading his or her fingers. Also, length incrementation could be disposed along at least a portion of the gauge base to permit a user to measure articles as necessary. Preferably, the length incrementation will be disposed along a first side of the gauge base, the first shingle engaging surface will comprise a straight edge affixed to the gauge base generally perpendicularly to a longitudinal axis of the gauge base, and the straight edge will extend from only a second side of the gauge base. With this, the first shingle engaging surface will be functional but will not interfere with a users measuring activities.

Even further still, the shingle gauge can have a notch disposed on the gauge base in alignment with the first shingle engaging surface whereby a user can ensure proper shingle alignment. Preferably, there will be provided a plurality of notches disposed in alignment with at least some of the plurality of apertures. With this, each notch will align with the first shingle engaging surface when the engaging member is engaged with the notch's respective aperture.

Even further advantage can be gained by additionally including a handle affixed to the gauge base for enabling a user to grip and control the shingle gauge. Where such a handle is provided, the handle and the gauge base can be formed from a single piece of material bent into a generally U-shaped configuration with a first leg of the U comprising the handle and a second leg of the U comprising the gauge base. To prevent the shingle gauge from slipping from a users hand, a frictional coating of rubber, for example, can be disposed over at least a portion of the handle.

Of course, one should be mindful that the foregoing discussion is designed merely to instill a better appreciation of the inventor's contribution to the art. Therefore, before an embodiment of the invention is explained in detail, it must be made clear that the following details of construction, descriptions, and illustrations of inventive concepts are mere examples of the many possible manifestations of the invention.

DETAILED DESCRIPTION OF A PREFERRED EMBODIMENT

To assist one in better understanding and, in appropriate circumstances, practicing the present invention, certain preferred embodiments of the present invention for a shingle gauge are shown in the accompanying figures and are described with particularity below.

Figure 1:
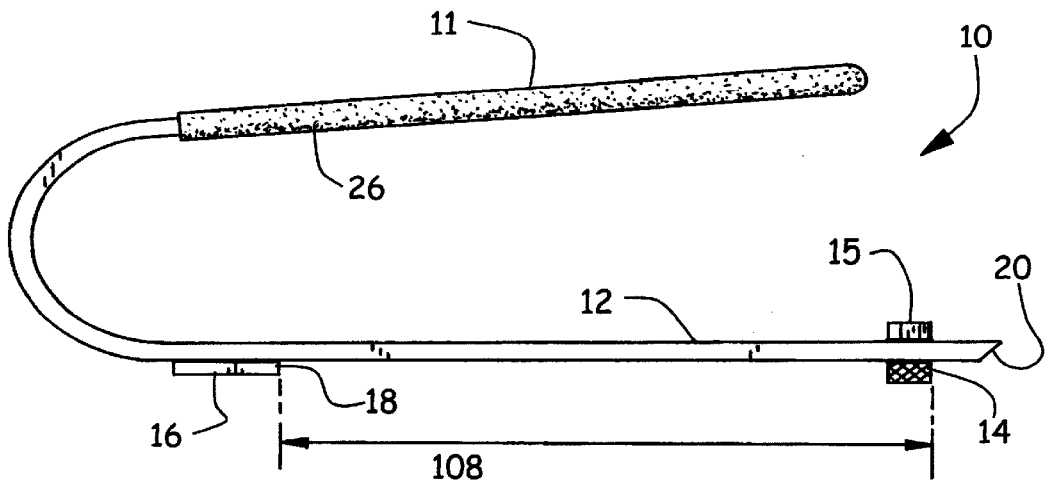
FIG. 1 is a view in side elevation of a shingle gauge according to the present invention.
Figure 2:
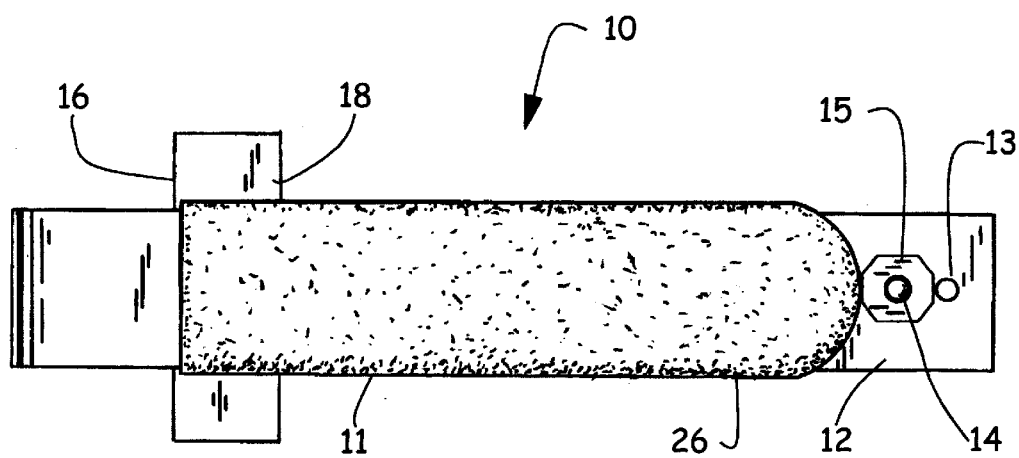
FIG. 2 is a top plan view of the shingle gauge of FIG. 1.

Looking more particularly to the accompanying drawings, one will see a preferred embodiment of the present invention for a shingle gauge indicated generally at 10 in FIG. 1. Although the shingle gauge 10 could be constructed from a wide variety of materials, the shingle gauge 10 ideally will be formed from a lightweight but durable material such as a rigid plastic or a lightweight metal such as aluminum.

Most basically, the shingle gauge 10 in this preferred embodiment comprises a single strip of material that is bent into a generally U-shape wherein a first leg of the U comprises a handle 11 and a second leg of the U comprises a gauge base 12. The handle 11 is preferably coated with a frictional material for improving frictional contact between the handle 11 and the hand of a user. Although a wide variety of frictional materials could be used within the scope of the present invention, it is presently preferred to coat the handle 11 with a rubber sleeve 26 that could be pre-formed and then slid onto the handle 11 or formed by dipping the handle 11 into a volume of liquid rubber.

Figure 3:
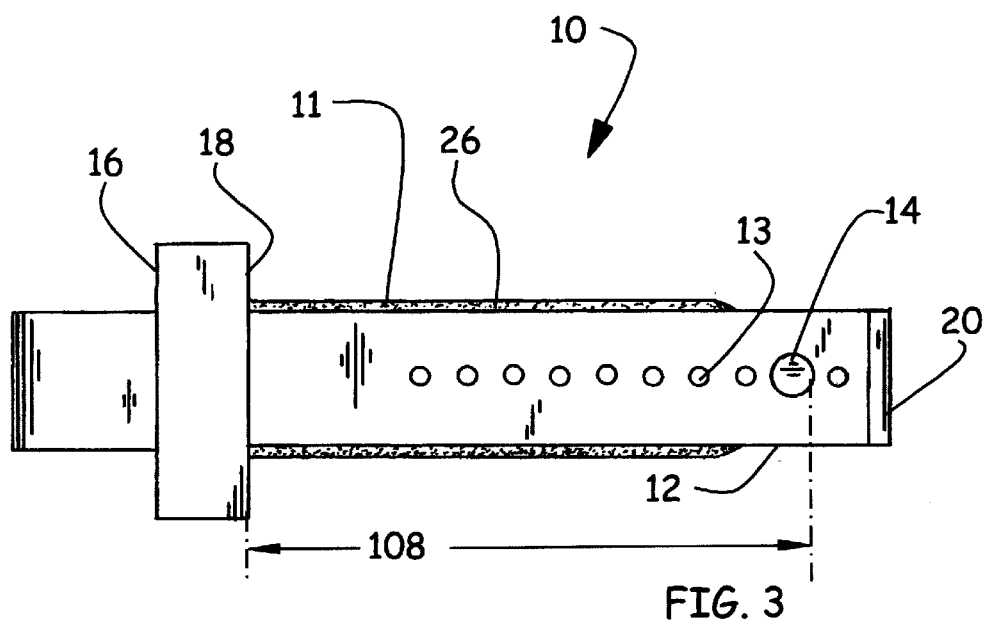
FIG. 3 is a bottom plan view of the shingle gauge of FIG. 1.

Looking to FIG. 3, one sees that the gauge base 12 has an exposure adjusting means located adjacent to the distal end of the gauge base 12. In the current embodiment of the invention, the exposure adjusting means comprises a plurality of predrilled openings 13 located in the gauge base 12 in combination with an engaging member or bolt 14 that passes through one of the pre-drilled openings 13 and a nut 15 that mounts onto the exposed end of the bolt 14. As will be discussed more fully hereinbelow, a user can choose a particular opening 13 based on the degree of desired exposure, which will be determined in part by the position of the distal surface of the head of the bolt 14. With this, the distal surface of the head of the bolt 14 can be termed a distal shingle engaging surface.

Of course, a wide variety of alterative adjusting means could be employed that would be well within the scope of the present invention. For example, although it is not expressly shown in the figures, the degree of exposure could be adjusted by slidably engaging the bolt 14 in a longitudinally communicating channel. Preferably, such a slidable bolt 14 could be locked in place as by a nut 15.

A straight edge 16 with a shingle engaging edge 18 is mounted to an outer surface of the gauge base 12 at a proximal end thereof. As will be described more fully below, the distance 108 between the distal surface of the bolt 14 of the nut 15 and bolt 14 combination and the shingle engaging edge 18, which may be termed more generally a proximal shingle engaging surface, of the straight edge 16 determines the degree of shingle exposure, which is also indicated at 108 in FIG. 4. With a shingle gauge 10 that is designed for use with roofing shingles, the distance 108 will be roughly on the order of 5 inches, with the exact distance 108 being determined by the opening 13 with which the nut 15 and bolt 14 are associated.

Of course, the distance 108 and the overall size of the shingle gauge 10 could be readily varied to suit particular applications. For example, since some siding comes in widths of 12 inches or greater, one could readily contemplate a shingle gauge 10 with a distance 108 of 12 or more inches. Such a shingle gauge 10 might have only a limited number of openings 13. Alternatively, the shingle gauge could have openings 13 extending along substantially the entire gauge base 12 as is indicated in FIG. 3 to allow the distance 108 to be varied from some maximum (i.e., 12 inches) to some minimum (i.e., 4 inches).

One will note from the figures that, as opposed to having a hexagonal shape, the head of the bolt 14 is round with a knurled surface. This is intentionally the case since the round head of the bolt 14 will ensure that the effective distance 108 remains the same notwithstanding the relative orientation of the head of the bolt 14. Furthermore, the knurling of the head of the bolt 14 advantageously provides for excellent gripping by a user's fingers.

The astute observer will note from FIG. 1 a further refinement of the present invention in the form of a beveled edge 20 at the most distal end of the gauge base 12. This beveled edge 20 advantageously allows one to slip the distal end of the gauge base 12 under a shingle that is to be installed. With this, a user can readily use the distal end of the gauge base 12 to pick the shingle up from a work surface or separate the shingle from a pile of shingles. One who is familiar with the art of shingle installation will appreciate that such a feature will save time and ease installation. Furthermore, it will eliminate unnecessary abrasion to the fingertips of a user who would otherwise have to scrape his or her fingers against the ground or another shingle to get under the shingle that is to be lifted.

Figure 4:
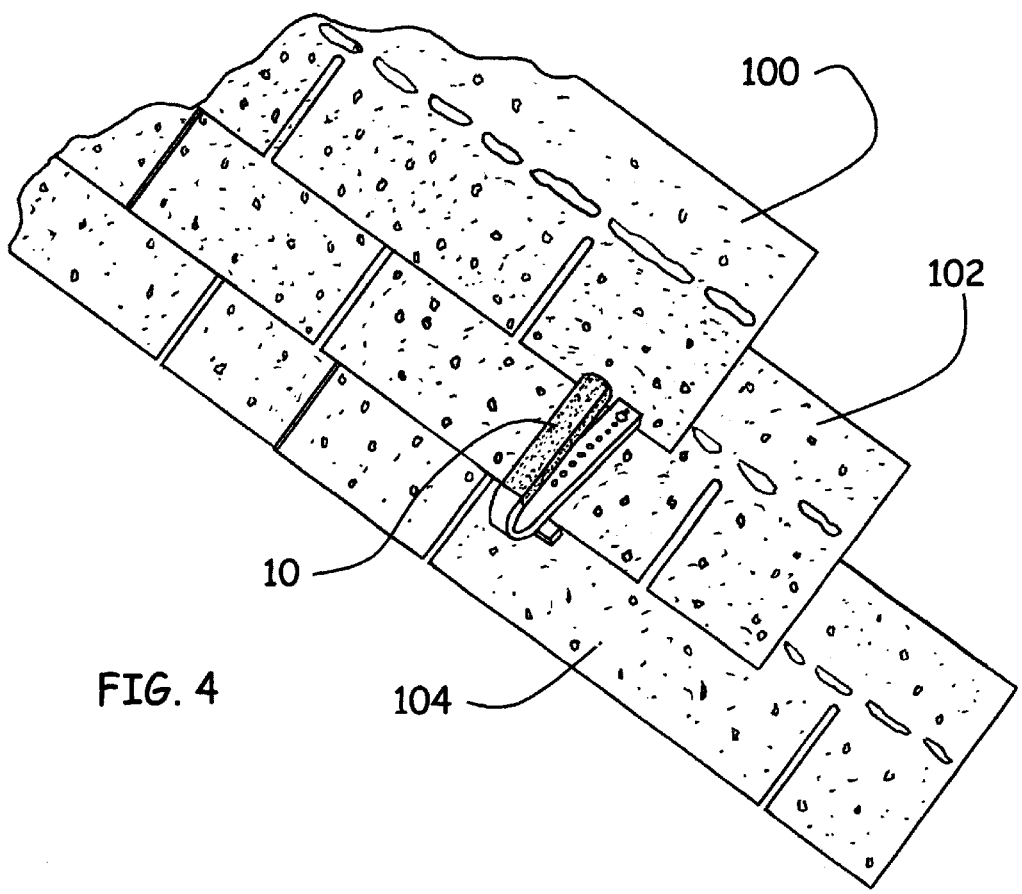
FIG. 4 is a perspective view of an embodiment of the present invention in use.

Although the present invention certainly is subject to a wide variety of uses, the use of the shingle gauge 10 during the installation of roofing shingles will provide a suitable example. Accordingly, use of an actual embodiment of the invention is illustrated in FIG. 4. In FIG. 4, a first row or course 104 of shingles and a second row 102 of shingles are shown already installed on a rooftop. The user is in the process of installing a third row 100 of shingles.

Since the exposure 108 will ultimately be determined by the distance 108 between the shingle engaging edge 18 of the straight edge 16 and the distal surface of the bolt 14 of the nut 15 and bolt 14 combination, the adjusting means (e.g., the nut 15 and bolt 14 combination) has been first set to the desired exposure by locating the nut 15 and bolt 14 combination in the appropriate opening 13. With this, to install the fourth row 100 of shingles, the shingle engaging edge 18 is brought into contact with the bottom edge of the end of the end-most shingle of the third row 102 of shingles. Then the bottom edge of the first end of the first shingle of the fourth row 100 of shingles is butted against the distal surface of the bolt 14. With this, the exposure 108 of the first end of the first shingle of the fourth row 100 will be properly set, and the first end of that shingle can be secured to the rooftop.

Next, the exposure 108 of the second end of the first shingle of the fourth row 104 can be similarly adjusted and secured. Succeeding shingles can be attached by aligning a first end of the succeeding shingle with the second end of the preceding shingle, using the shingle gauge 10 to adjust the exposure 108 of the second end of the succeeding shingle in the manner specified, and securing the shingle appropriately. This procedure is repeated with each shingle to be installed to ensure a straight and level course for each ensuing row. It will be noted that the lightweight and portable nature of the shingle gauge allows a single installer to move quickly and easily along a row of shingles while maintaining a straight course with a minimum amount of required expertise and effort.

Figure 5:
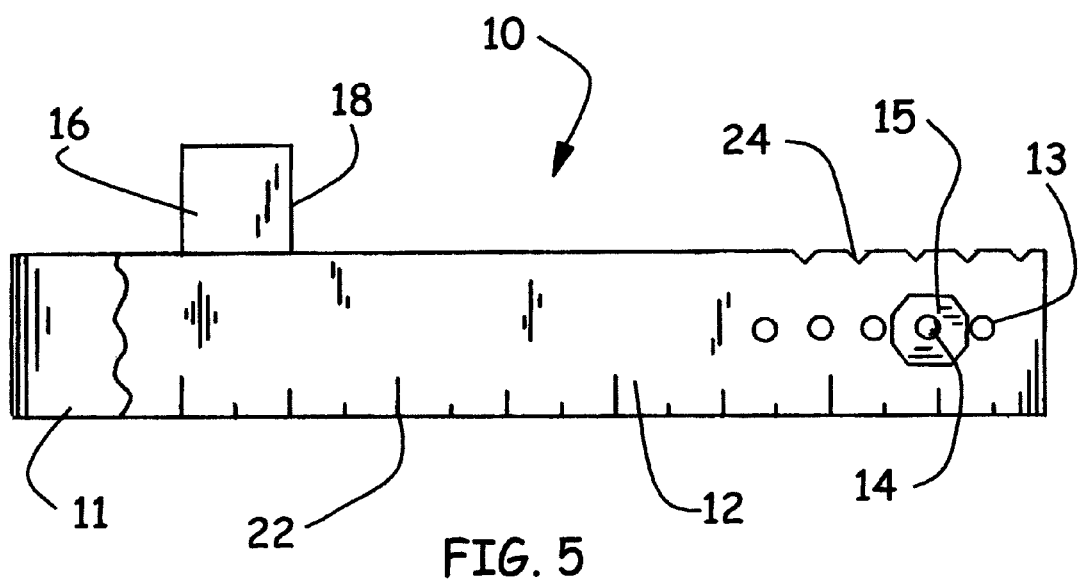
FIG. 5 is a top plan view of an alternative embodiment of the present invention.

Looking finally to FIG. 5, one sees an alternative embodiment of the shingle gauge wherein substantially the entire handle 11 has been sectioned away to allow a viewing of further aspects of the invention. In FIG. 5, the straight edge 16 extends from only one side of the gauge base 12. Also, length incrementation 22 is disposed along the gauge base 12. With these two adaptations, the shingle gauge 10 could readily be employed as a measuring tool with the gauge base 12 disposed over or adjacent to an article to be measured. Still further, notches 24 are provided in the gauge base 12 to allow a user to ensure that a bottom edge of a shingle is appropriately butted against the knurled head of the bolt 14. The notches 24 could be properly located in light of the size of the head of the bolt 14 such that, with a V-shaped notch 24, the bottom edge of the shingle would be in line with the base of the V in the notch 24. With this, the user would be readily aware if the head of the bolt 14 were not properly butted against the bottom of the shingle because the bottom of the shingle would not be properly aligned relative to the V of the respective notch 24.

From the foregoing, it will be clear that the present invention has been shown and described with reference to certain preferred embodiments that merely exemplify the broader invention revealed herein. Certainly those skilled in the art could conceive of alternative embodiments after learning of the present invention. For instance, those with the major features of the invention in mind could craft embodiments that incorporate those major features while not incorporating all of the features included in the preferred embodiments. With the foregoing in mind, the following claims are intended to define the scope of protection to be afforded the inventor, and the claims shall be deemed to include equivalent constructions insofar as they do not depart from the spirit and scope of the present invention.

It must be noted that a plurality of the following claims may express certain elements as a means for performing a specific function, at times without the recital of structure or material. As the law demands, these claims shall be construed to cover not only the corresponding structure and material expressly described in the specification but also equivalents thereof.

What is claimed is:

1. A unitary, handheld shingle gauge having a generally U-shaped configuration for controlling the overlap and exposure of shingles during installation, the shingle gauge comprising:

a unitary, U-shaped member with a first leg of a U that functions as a handle and a second leg of the U that functions as a gauge base;

wherein the gauge base has a first end and a second end;

wherein a first shingle engaging surface comprising a straight edge is disposed adjacent to the first end of the gauge base generally perpendicularly to a longitudinal axis of the gauge base; and a second shingle engaging surface disposed adjacent to the second end of the gauge base wherein the first shingle engaging surface and the second shingle engaging surface are separated by a given distance;

whereby a user can control the overlap and exposure of shingles during installation by engaging the first shingle engaging surface with an edge of a first course of shingles and engaging the second shingle engaging surface with an edge of a second course of shingles.

2. The shingle gauge of claim 1 further comprising a means for adjusting the distance between the first shingle engaging surface and the second shingle engaging surface.

3. The shingle gauge of claim 2 wherein the second shingle engaging surface is coupled to an engaging member and wherein the means for adjusting the distance between the first shingle engaging surface and the second shingle engaging surface comprises a plurality of apertures spaced longitudinally along the gauge base for selectively receiving the engaging member of the second shingle engaging surface whereby a user can insert the engaging member into a selected aperture of the plurality of apertures to select the distance between the first shingle engaging surface and the second shingle engaging surface.

4. The shingle gauge of claim 3 wherein the engaging member comprises a bolt and wherein the second shingle engaging surface comprises a bolt head.

5. The shingle gauge of claim 4 further comprising a nut for selectively locking the engaging member and the second shingle engaging surface in a given aperture of the plurality of apertures.

6. The shingle gauge of claim 5 wherein the bolt head is generally round whereby the distance between the first shingle engaging surface and the second shingle engaging surface will be consistent without regard to the angular orientation of the bolt head.

7. The shingle gauge of claim 3 further comprising a plurality of notches disposed on the gauge base in alignment with at least some of the plurality of apertures whereby each notch will align with the first shingle engaging surface when the engaging member is engaged with the notch's respective aperture.

8. The shingle gauge of claim 1 wherein the second end of the gauge base has a single-sided bevel facing outwardly from the generally U-shaped configuration of the shingle gauge whereby the shingle gauge can be angled relative to a surface and the second end can be used to lift and separate shingles.

9. The shingle gauge of claim 1 further comprising length incrementation disposed along at least a portion of the gauge base.

10. The shingle gauge of claim 9 wherein the length incrementation is disposed along a first side of the gauge base, wherein the first shingle engaging surface comprises a straight edge that extends laterally from only a second side of the gauge base.

11. The shingle gauge of claim 1 further comprising a notch disposed on the gauge base in alignment with the first shingle engaging surface whereby a user can ensure proper shingle alignment.

12. The shingle gauge of claim 1 wherein the handle and the gauge base are formed from a single piece of material bent into a generally U-shaped configuration.

13. The shingle gauge of claim 12 further comprising a frictional coating over at least a portion of the handle.

14. A shingle gauge for controlling the overlap and exposure of shingles during installation, the shingle gauge comprising:
   a gauge base with a first end and a second end;
   a handle coupled to the gauge base for enabling a user to grip and control the shingle gauge;
   a first shingle engaging surface comprising a straight edge disposed adjacent to the first end of the gauge base generally perpendicularly to a longitudinal axis of the gauge base; and
   a second shingle engaging surface disposed adjacent to the second end of the gauge base wherein the first shingle engaging surface and the second shingle engaging surface are separated by a given distance;
   wherein the handle and the gauge base are coupled in a generally U-shaped configuration wherein a first leg of the U comprises the handle and a second leg of the U comprises the gauge base;
   whereby a user can control the overlap and exposure of shingles during installation by engaging the first shingle engaging surface with an edge of a first course of shingles and engaging the second shingle engaging surface with an edge of a second course of shingles.

15. The shingle gauge of claim 14 further comprising a means for adjusting the distance between the first shingle engaging surface and the second shingle engaging surface.

16. The shingle gauge of claim 15 wherein the second shingle engaging surface is coupled to an engaging member and wherein the means for adjusting the distance between the first and second shingle engaging surfaces comprises a plurality of apertures spaced longitudinally along the gauge base for selectively receiving the engaging member of the second shingle engaging surface whereby a user can insert the engaging member into a selected aperture of the plurality of apertures to select the distance between the first shingle engaging surface and the second shingle engaging surface.

17. The shingle gauge of claim 16 wherein the engaging member comprises a bolt and wherein the second shingle engaging surface comprises a bolt head.

18. The shingle gauge of claim 17 wherein the bolt head is round whereby the distance between the first shingle engaging surface and the second shingle engaging surface will be consistent without regard to the angular orientation of the bolt head.

19. The shingle gauge of claim 14 wherein the second end of the gauge base has a bevel facing outwardly from the generally U-shaped configuration of the shingle gauge whereby the second end can be used to lift and separate shingles.

* * * * *